US005422954A

United States Patent [19]

Berson

[11] Patent Number: 5,422,954

[45] Date of Patent: Jun. 6, 1995

[54] APPARATUS AND METHOD OF PRODUCING A SELF PRINTED INSPECTION LABEL

[75] Inventor: William Berson, Westport, Conn.

[73] Assignee: Pitney Bowes Inc., Stamford, Conn.

[21] Appl. No.: 145,551

[22] Filed: Nov. 4, 1993

[51] Int. Cl.[6] .................... H04L 9/00

[52] U.S. Cl. .................... 380/51

[58] Field of Search .................... 380/51

[56] References Cited

U.S. PATENT DOCUMENTS

| | | | |
|---|---|---|---|
| 4,660,221 | 4/1987 | Dlugos | 380/51 X |
| 4,812,965 | 3/1989 | Taylor . | |
| 5,075,852 | 12/1991 | Salazar et al. . | |
| 5,293,465 | 3/1994 | Abumehdi et al. | 380/51 X |

*Primary Examiner*—Gilberto Barron, Jr.
*Attorney, Agent, or Firm*—Ronald Reichman; Melvin J. Scolnick

[57] ABSTRACT

Postage dispensing apparatus and method of producing a label that indicates parameters of the postage dispensing apparatus in a code, preferable in encrypted code. A processor is programmed with an encryption algorithm and the printer of the apparatus is a dot matrix printer that is capable of printing a code such as a bar code or two dimensional code. A label is imprinted with data, preferably in encrypted format, that represents a record of the parameters of the postage dispensing device. This serves as a record of the use and status of the postage dispensing apparatus.

28 Claims, 1 Drawing Sheet

APPARATUS AND METHOD OF PRODUCING A SELF PRINTED INSPECTION LABEL

BACKGROUND OF THE INVENTION

From the days that Arthur Pitney was issued U.S. Pat. No. 710,997 and subsequently developed the postage meter, it has been the standard for the dispensing of postage in a secure fashion. The postage meter has represented a secure device whereby the user thereof can purchase postage value and the postal service has assurance that payment has been made for any postage dispensed. Throughout the decades, the postage meter has performed well, but with the advent of dot matrix printers and the need for high speed, high volume operations, need has been expressed for more flexible postage dispensing devices. Such need has been expressed in terms of seeking a device that will provide security without the cost associated with the manufacturing and present periodic inspection of a postage meter.

The primary components of a postage meter are: at least one register for determining the amount of postage value purchased by a user, a printer for printing a postage indicia, a data input unit, and a control mechanism. These units are contained within a secure housing and are often provided with seals. To further secure the postage dispensing activities of postage meters, inspections of such meters are conducted periodically to assure that the meter is functioning properly and no tampering has occurred with the meter.

Recently, schemes have been suggested for using an unsecured printer as disclosed in U.S. Pat. Nos. 4,855,920 and 4,962,454. Even though these suggested uses of an unsecured printer were advantageous, they still required a secure device for the accounting. Clearly, it would be advantageous to be able to have a postage dispensing apparatus wherein the amount of physical security provided for the apparatus is reduced substantially and the cost thereof is reduced accordingly. It also would be advantageous to be able to provide a convenient and inexpensive manner of inspecting a postage dispensing device to assure that postage is dispensed in an authorized manner.

SUMMARY OF THE INVENTION

A postage dispensing device has been conceived that yields a high level of security and provides a convenient way of inspection. This is achieved through the use of an encryption scheme. A processor is in communication with the various components of the postage dispensing device, so as to receive data therefrom. The processor is programmed with an encryption algorithm, whereby data received from the postage accounting registers can be encrypted. A dot matrix printer in communication with the processor to print an encrypted code. This encrypted code is printed on a label that can be attached to the postage dispensing apparatus for inspection by a postal authority. In addition, if any tampering is attempted with the processor, or other components of the postage dispensing apparatus, notice of the same is given by printing an encoded or encrypted message on the label. The encrypted message can also be printed on a card that is mailed to the post office periodically.

DETAILED DESCRIPTION OF THE PREFERRED EMBODIMENT

Figure 1:
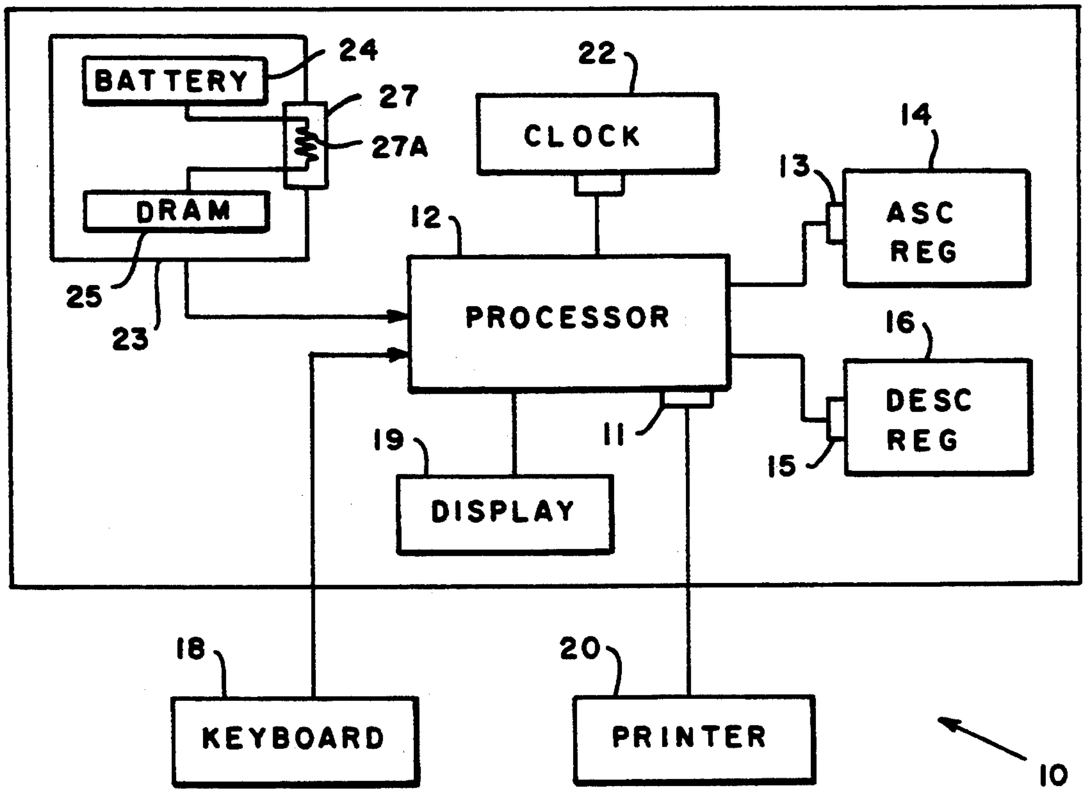
FIG. 1 is a block diagram that represents a postage value dispensing apparatus in which the present invention can be practiced.

With reference now to FIG. 1, a postage dispensing apparatus is shown generally at 10 and includes a processor 12 that is in communication with an ascending register 14 and a descending register 16 all of which are enclosed in a housing 17 that need not be a secure housing. As in known in the art, the ascending register maintains a record of all the postage dispensed by the postage dispensing apparatus 10 and the descending register 16 maintains a record of the amount of postage that has been purchased by the user and which is available to be dispensed. The processor 12 can be any of a number of commercially available processors such as a model 80386 microprocessor available from Intel Corporation or a TMS 320/C25 processor available from Texas Instruments Corporation. Sensors 11, 13 and 15 are connected physically and electronically to the processor 12, ascending register 14 and descending register 16, respectively.

The processor 12 is in communication with a data input device, such as a keyboard 18, wherein the amount of postage to be dispensed and other data can be input and a display 19. A printer 20 is also in communication with the processor and will receive commands from the processor 12 for the amount of postage to be dispensed and other data to be printed as will be described hereinafter. The printer is a dot matrix printer that is capable of printing codes. An example of such a printer 20 is model 2464 thermal printer available from Monarch Marking Systems. It will be appreciated that the keyboard 18 can be a part of the printer 20, but preferably the keyboard is a separate unit.

In communication with the processor 12 is a memory unit 3 that includes a battery 24, such as a lithium battery, a volatile memory 25, such as a dynamic RAM, and a sensor-switch 27 that is capable of sensing any attempt to temper with the memory unit. The leads from the battery 24 and DRAM 25 are connected to a mechanical "fuse" 27A in the sensor-switch 27. The fuse 27A is made of a frangible material that will break upon any form of pressure or force being applied to the memory unit 23. Upon the fuse 27A rupturing, as a result of tampering, the connection between the battery 24 and DRAM 25 is broken.

In accordance with the instant invention, the DRAM is programmed with an encryption algorithm by an authorized individual during manufacture of the postage dispensing device 10 which DRAM supplies the algorithm to the processor 12. After delivery of the device 10 to the mailer, if any tampering with the memory unit 23 occurs, the connection between the battery 24 and the DRAM 25 will be broken with the result that the DRAM loses power and the data therein is erased. Thereafter, the postage dispensing device is unable to print an encrypted message. Although the memory unit 23 is shown as an independent unit, it will be appreciated that it can be incorporated in the processor 12, but is shown separately more for purposes of illustration and clarity.

Optionally, the postage dispensing device 10 can include a clock 22 that inputs the time events occur. This can be used as a further security tool as will be described hereinafter.

Figure 2:
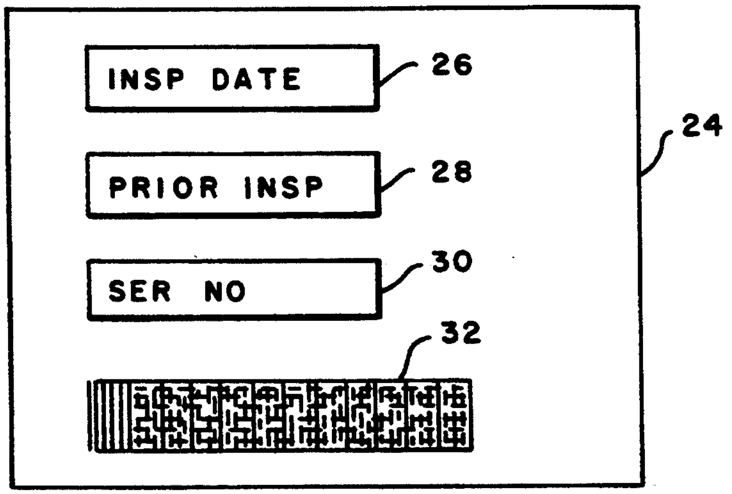
FIG. 2 is a plan view of a label that incorporates features of the instant invention.

With reference now to FIG. 2, a document in the form of a label is shown at 24 on which inspection data can be imprinted by the printer 20. Preferably, the label 24 is a self adhesive label that can be attached to the postage dispensing device 10 or to a post card that is then sent to the Post Office. In response to input from the keyboard, the printer 20 will imprint the date 26 at which the postage dispensing device inspected, the date of the prior inspection 28, the serial number of the postage dispensing device 30 and an encrypted code 32.

The encrypted code 32 can be a one dimensional code, such as a bar code, or it can be a two dimensional code, also known as dense code, such as those developed and licensed by Symbol Technologies Inc. and Data Matrix Corp. Whether a one dimension code or two dimensional code it should be a code that is readily readable by an appropriate scanner, such as a hand held laser scanner that is appropriately programmed. Such scanners are commercially available, such as laser scanners available from Welsh Allyn Inc. and Symbol Technologies Inc., such scanners have processors that are programmed with logic that allows decoding of a code being scanned.

In operation, the processor 12 will be programmed with an encryption algorithm, as is known in the art. Reference can be had to U.S. Pat. Nos. 4,853,961, 5,073,935 and 5,142,577 wherein suitable encryption schemes are disclosed. In addition, a standard encryption scheme, such as the RSA encryption technique, can be used for the purpose of programming the processor 12. Such schemes rely on the reader of the code being provided with a decryption key for the purposes of reading an encoded message. The processor 12 is in communication with the ascending register 14 and descending register 16 so that upon the dispensing of postage, data is communicated between the processor 12 and the two registers 14, 16. Upon data being entered through the keyboard 18, the processor will command the printer 20 to print the appropriate postage. The printer 20 will print a standard postage indicia with the value that has been entered by the keyboard 18. Upon such printing of the postage indicia, the processor will cause the value in the descending register 16 to reduced by an equal amount and will cause the ascending register 14 to be increased by the same amount.

Periodically, the postage dispensing apparatus 10 is inspected and activated to print a label 24 that indicates a history and status of the apparatus. The user, or a postal authority, will input data through the keyboard 18 that will command the processor 12 to have an inspection label 24 printed. The printer 20 is unsecured, i.e. access is not denied, but a wrongdoer cannot cause it to print a valid inspection label 24; only the processor 12 can do this. The operator must have both the valid encryption key and the decoding algorithm for the code which will reside in the aforementioned scanner.

The processor 12 polls the ascending register 14 and descending register 16 to determine the values set therein. If so equipped, the clock 22 will also be polled. The processor 12 will then command the printer 20 to print the data on the face of the label 24 including the date and time that the label is printed 26, the identification number of the apparatus 30 and the last prior inspection date 28. In addition, the printer 20 will print, in encoded fashion, information relative to the amount remaining in the descending register 16, the amount of postage dispensed previously as indicated by the register 14, the time and date and data that would show irregularities or defects in the postage printing device.

In addition, the processor 12 will cause an encrypted message to be printed on a document to indicate the detection by the sensors, 11, 13, 15 of any tampering. Ways of detecting such defects and irregularities are known, see for example U.S. Pat. No. 4,507,744 and 4,812,965. An algorithm for responding to such defects and irregularities, which would include tampering, can be programmed into the processor so that upon extraneous signals being received from the sensors 11, 13, 15, the processor 12 can relate this data in terms of the encrypted code that is stored in the memory unit 23 and accessed by the processor 12. The program in the memory unit 23 has a self diagnostic/reporting mode wherein the activity associated with the apparatus is recorded in the encrypted code 32. Although a two dimensional code is shown in FIG. 2, it will be appreciated that a one dimensional code can be used.

To inspect the meter, the code 32 is generated by the DRAM 25, accessed by the processor 12, printed on the label 24 and then the label is scanned by a reading device such as a laser scanner that has been appropriately programmed. The identification information, as well as the security code registers and check sums, are automatically entered into a verifier system, then decompressed by the scanner and decoded as is known in the art. The verifier then indicates by way of a display on the scanner whether the postage dispensing apparatus is performing properly, whether there has been tampering or if there is an error. In the case of an error, the values are caused to be displayed in sequence on the display 19 of the postage dispensing apparatus 10 and can be entered manually into the verifying system. The verifier can be connected to a central computer in the post office. This inspection data can be created by anyone by causing the inspection label to be printed, but the data can only be decrypted by someone with a valid verifier which has the correct encryption.

There are three levels of code security that can be used. The first level is a non-encrypted code such as a bar code. This code contains inspection results including identification of the meter, register setting, self test results and diagnostics. By self test results is meant activities such as looking for consistency, i.e. ascending register is greater and descending register is less then read from the prior inspection. By diagnostics is meant providing a stimulus to various components to assure proper functioning of the same. The second level is the same as the first level except that the code 32 is encrypted. The third level of security involves incorporating an encryption certificate for the label which contains the encryption key as is taught in U.S. Pat. No. 4,853,961.

Thus, what has been shown and described is a postage dispensing apparatus having a self inspection capability that can be ascertained readily. With a dot matrix printer used for the purpose of dispensing postage, a more flexible and inexpensive postage dispensing apparatus is obtained which is also capable of printing encrypted code. The use of such code for purposes of inspection provides a form of secrecy that enhances security.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A postage dispensing apparatus comprising:

a) processor having an encoding scheme programmed therein for translating inspection data received by said processor into coded form;

b) a descending register in communication with said processor for exchanging data with said processor c) a dot matrix printer in communication with said processor; said dot matrix printer prints an encoded message containing the translated inspection data received by said processor; and d) means for providing a label attached to said apparatus, said label having inspection data printed thereon in code thereon.

2. The postage dispensing apparatus of claim 1, further including an ascending register in communication with said processor.

3. The postage dispensing apparatus of claim 2, further including a sensor connected to each of said processor and said ascending and descending registers, each of said sensors being in communication with said processor.

4. The postage dispensing apparatus of claim 3, further including a clock in communication with said processor.

5. The postage dispensing apparatus of claim 1, wherein said matrix printer prints an encoded bar code.

6. The postage dispensing apparatus of claim 4, wherein said clock is contained within a housing and further including a sensor attached to said clock and in communication with said processor.

7. The postage dispensing device of claim 6, further including an encode label attached to said housing.

8. The postage dispensing device of claim 4, wherein said processor includes a memory unit having a battery and a volatile memory in communication with said battery.

9. The postage dispensing device of claim 8 wherein said memory unit includes a sensor-switch in communication with said volatile memory and said battery.

10. A postage dispensing apparatus comprising:

a) processor means having an encoding scheme programmed therein for translating inspection data received by said processor into coded form;

b) a descending register in communication with said processor for exchanging data with said processor;

c) a dot matrix printer in communication with said processor, said dot matrix printer prints an encoded message containing the translated inspection data received by said processor means; and d) means for providing a label to said printer for having an encrypted code printed thereon.

11. The postage dispensing apparatus of claim 10 further including an ascending register in communication with said processor.

12. The postage dispensing apparatus of claim 11 further including a sensor connected to each of said processor and said ascending and descending registers, each of said sensors being in communication with said processor.

13. The postage dispensing apparatus of claim 12 further including a clock in communication with said processor.

14. The postage dispensing apparatus of claim 13 further including a sensor attached to said clock and in communication with said processor.

15. The postage dispensing device of claim 10 further including an encode label attached to said housing.

16. The postage dispensing device of claim 15 wherein said processor means includes means for detecting tampering with said processor means.

17. The postage dispensing device of claim 15 wherein said processor means includes a processor and a memory unit having a battery, a sensor in communication with said battery and a non volatile memory in communication with said sensor, said detecting means and said processor.

18. The postage dispensing device of claim 17 wherein said tampering detecting means comprises a mechanical fuse in communication with said battery and non volatile memory.

19. In a method of providing security to a postage dispensing device, the steps comprising:

a) programming a processor with an encoding algorithm;

b) communicating to the processor inspection data relative to parameters concerning an ascending register;

c) encoding inspection data that is received by the processor from the ascending register;

d) communicating encoded inspection date to a printer; and e) printing an encoded inspection message on a document.

20. The method of claim 19 further including scanning the printed encoded document with a scanner having a verifying algorithm therein.

21. The method of claim 20 wherein the step of programming the processor includes programming an encryption algorithm and the step of printing the code includes printing includes printing an encrypted bar code.

22. The method of claim 21 wherein said step of printing an encrypted code includes printing a two-dimensional code.

23. In a method of providing security to a postage dispensing device, the steps comprising:

a) programming a processor with an encoding algorithm;

b) communicating to the processor inspection data relative to parameters concerning the postage dispensing apparatus;

c) encrypting the inspection parameter data; and d) printing an encrypted message on a document resulting from the inspection parameter data.

24. The method of claim 23 further including scanning the printed encrypted code with a scanner having a verifying algorithm therein.

25. The method of claim 23 wherein step of printing the encrypted code includes printing an encrypted bar code.

26. The method of claim 23 wherein said step of printing an encrypted code includes printing a two-dimensional code.

27. The method of claim 23 wherein said step of communicating of parameter data includes communicating descending register data.

28. The method of claim 23 wherein said step of communicating parameter data includes communicating clock data.

* * * * *